UNITED STATES PATENT OFFICE.

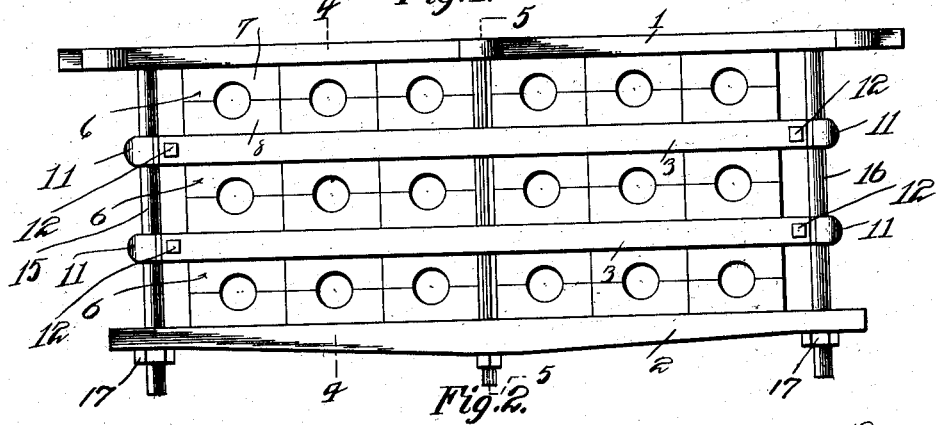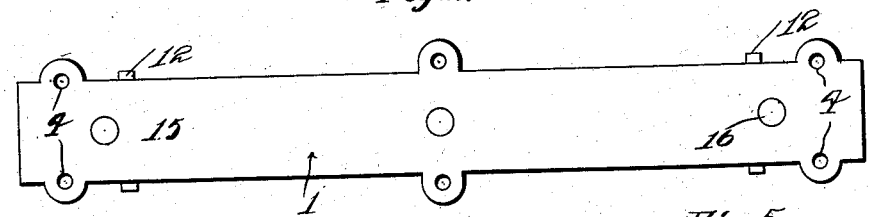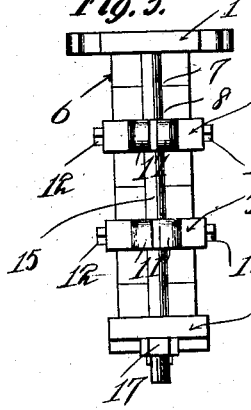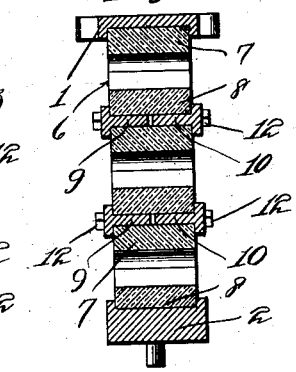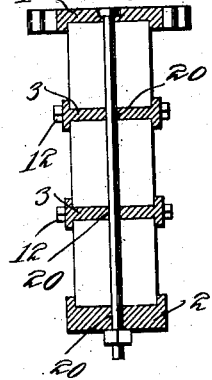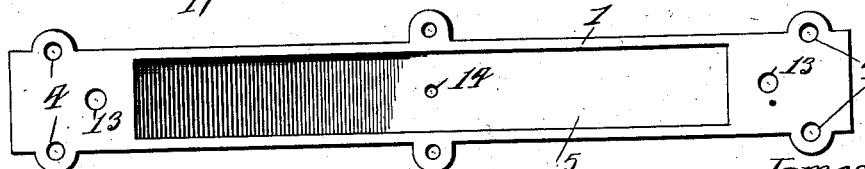

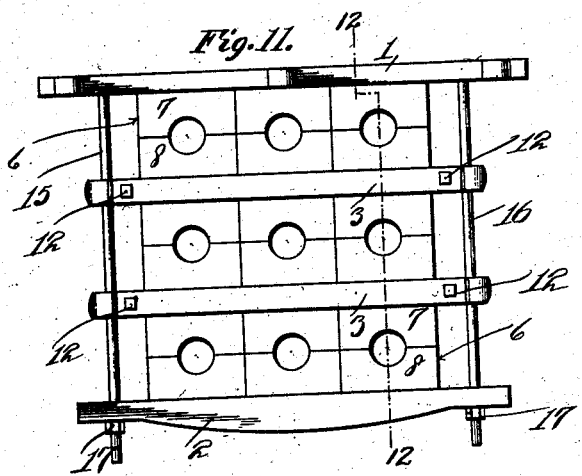
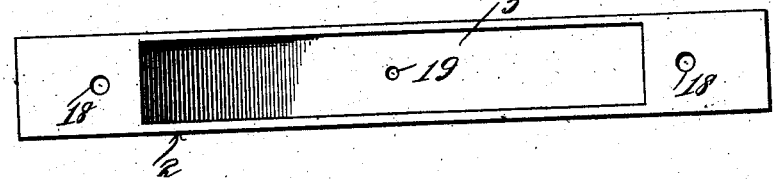
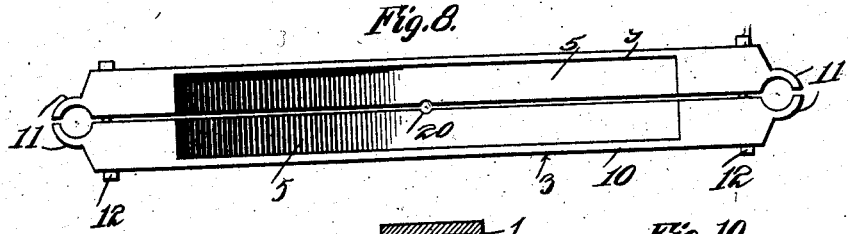
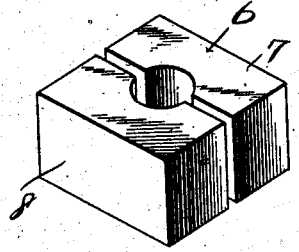
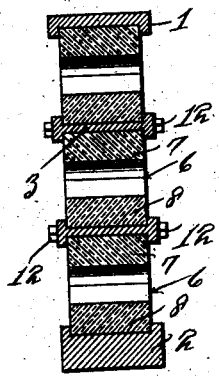
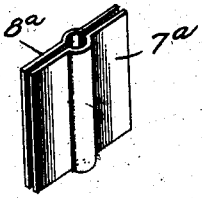

JAMES KRAUS, OF KIMBERLY, WISCONSIN.

CABLE-RACK.

1,133,976.  Specification of Letters Patent.  Patented Mar. 30, 1915.

Application filed November 12, 1913. Serial No. 800,596.

*To all whom it may concern:*

Be it known that I, JAMES KRAUS, a citizen of the United States, residing at Kimberly, in the county of Outagamie and State of Wisconsin, have invented new and useful Improvements in Cable-Racks, of which the following is a specification.

This invention relates to racks or supports for electric conducting cables and insulators, the object of the invention being to provide a rack adapted for general uses in supporting a plurality of cables and their insulators, and which enables the insulators to be readily and conveniently applied and removed and any certain insulator or insulators be applied, removed or had access to without disturbing the others.

A further object of the invention is to provide a rack or support of the character described which by slight modifications may be adapted to support insulators and cables horizontally, vertically and at any desired elevation, and which is adapted for the support of either direct or alternating current cables.

The invention consists of the features of construction, combination and arrangement of parts herein fully described and claimed, reference being had to the accompanying drawings in which:—

Figure 1 is a side elevation of a cable rack embodying my invention. Fig. 2 is a top plan view thereof. Fig. 3 is an end elevation. Figs. 4 and 5 are vertical transverse sections on the lines 4—4 and 5—5 of Fig. 1. Fig. 6 is a bottom plan view of the top plate. Fig. 7 is a top plan view of the bottom plate. Fig. 8 is a top plan view of one of the intermediate plates. Figs. 9 and 10 are detail views of insulators employed. Fig. 11 is a side elevation of a modified form of rack. Fig. 12 is a vertical transverse section on the line 12—12 of Fig. 11.

In carrying my invention into practice I provide a rack comprising a top plate 1, a bottom plate 2, and one or more intermediate plates 3. As shown in the present instance, the rack is adapted to be secured to a ceiling or overhead support and the top plate is provided with openings 4 for the passage of bolts or other suitable fastening devices, but, it will be understood, that the rack may by slight modifications be adapted for either vertical or horizontal use and to be supported upon a floor, wall, ceiling or any other suitable support at any desired elevation. The opposing faces of the respective plates are provided with longitudinal channels or recesses 5 forming seats for insulators 6, each of which may be constructed in the usual manner of separable sections 7 and 8, the arrangement being such that the insulators may be arranged and held in rows between the plates, as shown. Each intermediate plate is composed of two longitudinally divided sections 9 and 10 terminating in coöperating pairs of hook-shaped projections forming split eyes 11 at the opposite ends of the plate, the sections of which are adapted to be held connected by detachable bolts 12 coupling the same adjacent to the eyes. The top plate 1 is provided with end and central openings 13 and 14 receiving the upper ends of end and central supporting bolts or rods 15 and 16, which are riveted or otherwise rigidly connected at their upper ends to said top plate and are threaded at their lower ends to receive retaining nuts 17. The bottom plate 2 is similarly provided with end and central openings 18 and 19 for the passage of said bolts and is held supported in position thereon by the nuts 17. The eyes 11 of the intermediate plates 3 slidably engage the rods 15 and the sections 9 and 10 of each of said plates are provided with semi-circular recesses 20 forming an opening for the passage of the central bolt 16, thus enabling the intermediate plates and bottom plate to be applied and removed by sliding them on the rods when the nuts 17 are detached. The rows of insulators 6 are arranged between the plates and clamped within the recesses 5 thereof, whereby the sections of the insulators are held closed and the insulators and cables passing therethrough firmly fastened in position.

It will be understood that the sections 9 and 10 of each intermediate plate may be disconnected by removing the bolts 12 and said sections withdrawn laterally from the opposite sides of the rack.

When the rack is vertically disposed a convenient mode of assembling the sections, insulators and cables, is to first apply the bottom plate 2 to the lower ends of the supporting bolts or rods, then fit the bottom sections 8 of the lower row of insulators therein, then place the cables in position in the grooves of said insulator sections and place the top sections 7 of the bottom row of insulators in place, and then apply the sections of the lower intermediate plate and bolt them together, after which the bottom insulator sections of the second row may be laid thereon, etc., and thus purposes of building up pursued until all the rack sections are assembled and the insulators and cables placed in position. When the insulators are so supported, it is evident that by the construction of the intermediate plates of detachable sections which may be removed laterally, that any one of the insulators or cables may be arranged and withdrawn and reapplied, or any number of the insulator sections taken out without disturbing the others. The insulator sections which come at the center in proximity to the center bolt 16 are preferably provided with grooves 20 whereby they may loosely embrace the bolt and come closely together.

It will be observed that the device forms a strong and durable construction or support which may be made of any size to firmly and securely hold any number of insulators and cables. When the rack is used for cables carrying direct current all of the sections thereof, except the bolts, may be made of cast iron, but when used for cables carrying an alternating current, the base is made of cast iron while the remaining parts are made of composition brass or other suitable material. In Fig. 10 I have shown insulators 7ª and 8ª in the form of lining strips or plates, which may be used in conjunction with blocks of the construction shown in Fig. 9, which may or may not be formed of non-conducting material. The mode of employing these insulating plates or strips will be apparent from the foregoing description.

In Figs. 11 and 12 I have shown a slightly modified construction of rack which is designed particularly for holding a small number of insulators and cables. In this construction the center bolt or rod and coöperating features are dispensed with, the construction otherwise being the same as that previously described.

I claim:—

1. A cable rack comprising outer plates, bolts fixed to one of said outer plates and with which the other outer plate is detachably connected, and an intermediate plate engaging the bolts, said plates being adapted to receive and hold insulators between the faces thereof, the intermediate plate being provided with insulator retaining flanges and formed of separable longitudinal sections adapted to be disconnected and withdrawn laterally from engagement with the bolts.

2. A cable rack comprising outer plates, bolts rigidly connected with one of said outer plates and with which the other outer plate is detachably connected, an intermediate plate engaging the bolts, said plates having recesses in their opposed faces to receive and hold rows of insulators, the said intermediate plate being composed of longitudinal sections separably connected and adapted when detached to be withdrawn laterally from engagement with the bolts.

3. A cable rack comprising outer plates, end and intermediate bolts fixed to one of said outer plates and with which the other outer plate is detachably connected, an intermediate plate engaging said bolts, said plates having recesses in their opposed faces to receive and hold rows of insulators, the intermediate plate comprising longitudinal separable sections having notches for the passage of the intermediate bolt and coöperating parts forming eyes engaging the end bolts, the construction being such that when the sections of the intermediate plate are disconnected said sections may be withdrawn laterally from engagement with the bolts.

In testimony whereof I affix my signature in presence of two witnesses.

JAMES KRAUS.

Witnesses:
E. C. HILFERT,
T. A. JACOBS.